United States Patent [19]
Balcar

[11] Patent Number: 5,674,616
[45] Date of Patent: Oct. 7, 1997

[54] GLASS BEADS HAVING IMPROVED FRACTURE TOUGHNESS

[75] Inventor: Gerald P. Balcar, Dunkirk, N.Y.

[73] Assignee: Conversion Technologies International, Inc., Hazlet, N.J.

[21] Appl. No.: 384,072

[22] Filed: Feb. 6, 1995

[51] Int. Cl.$^6$ ................................. C03C 12/00
[52] U.S. Cl. ..................... 428/402; 501/33; 501/34; 501/53; 501/55; 501/72; 65/111
[58] Field of Search ............ 65/111, 21.2, 21.4; 501/33, 34, 53, 55, 72, 58, 59, 68, 69, 101, 133, 70; 428/402

[56] References Cited

U.S. PATENT DOCUMENTS

| | | | |
|---|---|---|---|
| 3,630,700 | 12/1971 | Hammel | 65/21.4 |
| 3,843,340 | 10/1974 | Cone . | |
| 4,063,916 | 12/1977 | De Vos et al. | 65/21.2 |
| 4,065,317 | 12/1977 | Baak et al. | 501/69 |
| 4,082,427 | 4/1978 | Nakashima | 350/105 |
| 4,118,450 | 10/1978 | Nakamura et al. | 501/80 |
| 4,141,742 | 2/1979 | Nakajima | 106/47 |
| 4,192,576 | 3/1980 | Tung et al. | 350/105 |
| 4,199,364 | 4/1980 | Neely | 501/70 |
| 4,332,354 | 6/1982 | deMonterey et al. | 241/16 |
| 4,366,252 | 12/1982 | Weaver | 501/72 |
| 4,367,919 | 1/1983 | Tung et al. | 350/105 |
| 4,386,162 | 5/1983 | Beall | 501/3 |
| 4,391,646 | 7/1983 | Howell | 501/34 |
| 4,467,039 | 8/1984 | Beall et al. | 501/57 |
| 4,564,556 | 1/1986 | Lange | 501/33 |
| 4,567,400 | 1/1986 | Opresko | 313/457 |
| 4,618,525 | 10/1986 | Chamberlain et al. | 428/209 |
| 4,687,749 | 8/1987 | Beall | 501/5 |
| 4,758,469 | 7/1988 | Lange | 428/325 |
| 4,772,511 | 9/1988 | Wood et al. | 428/325 |
| 4,830,990 | 5/1989 | Connelly | 501/72 |
| 4,931,414 | 6/1990 | Wood et al. | 501/103 |
| 4,975,619 | 12/1990 | Datta et al. | 313/466 |
| 4,988,555 | 1/1991 | Hedblom | 428/172 |
| 5,002,911 | 3/1991 | Matsumoto et al. | 501/105 |
| 5,040,870 | 8/1991 | Ohno et al. | 359/443 |
| 5,064,785 | 11/1991 | Kawamoto et al. | 501/72 |
| 5,091,345 | 2/1992 | Becker | 501/72 |
| 5,098,874 | 3/1992 | Brar et al. | 501/136 |
| 5,108,477 | 4/1992 | Cornelius et al. | 65/18.1 |
| 5,128,203 | 7/1992 | LaRoche | 428/325 |
| 5,210,057 | 5/1993 | Haun et al. | 501/69 |
| 5,236,495 | 8/1993 | Manabe et al. | 501/1 |
| 5,273,566 | 12/1993 | Balcar et al. | 65/17 |
| 5,284,807 | 2/1994 | Komori et al. | 501/35 |
| 5,286,682 | 2/1994 | Jacobs et al. | 501/34 |
| 5,292,690 | 3/1994 | Kawachi et al. | 501/33 |

FOREIGN PATENT DOCUMENTS

| | | |
|---|---|---|
| 52-3612 | of 1977 | Japan . |
| 54-31415 | of 1979 | Japan . |
| 57-11846 | of 1982 | Japan . |
| 1-167260 | of 1989 | Japan . |
| 138649 | of 1987 | Poland . |

*Primary Examiner*—Jill Warden
*Assistant Examiner*—Alexander Markoff
*Attorney, Agent, or Firm*—Collier, Shannon, Rill & Scott, PLLC

[57] ABSTRACT

Glass beads in accordance with the present invention may be constituted of $SiO_2$, $Al_2O_3$, $Na_2O$, $K_2O$, BaO, SrO, $TiO_2$, and $CeO_2$. The glass of which the glass beads is made will generally contain at least 40% $SiO_2$ as the network former, from about 10 to about 25% $Na_2O$ and $K_2O$ as fluxes, from about 5 to about 25% of BaO and/or SrO as a fracture resistance improvement components, a small amount of $Al_2O_3$, and—when made from CRT waste—very small amounts of $TiO_2$ and $CeO_2$. The glass beads of the invention are suitable for use as reflective elements in roadway markings and as media in shot-peening metal cleaning procedures.

19 Claims, No Drawings

GLASS BEADS HAVING IMPROVED FRACTURE TOUGHNESS

FIELD OF THE INVENTION

This invention relates to glass beads that are suitable for use as reflective elements in roadway markings and as media in shot-peening and metal cleaning loose grain procedures.

BACKGROUND OF THE INVENTION

Soda-lime glass

Most commercial glasses fall into the category of silicates containing modifiers and intermediates. Addition of a modifier such as sodium oxide to the silica network alters the structure by cleaving the Si—O—Si bonds to form Si—ONa linkages. Alkali silicates that have a silica:alkali ratio of 0.5–3.4 are the basis of the soluble silicate glass industry. Mixtures of alkali and alkaline earths gives glasses of higher durability than the alkali silicates. These glasses are known as soda-lime glasses.

The glasses commonly used for windows, bottles, automobile windshields, and most other container and construction uses is soda-lime glass. The actual compositions of soda-lime glasses are usually more complex than the terminology "soda-lime" suggests. In addition to $Na_2O$, CaO, and $SiO_2$, these glasses may contain MgO, $Al_2O_3$, BaO, and/or $K_2O$ and various colorants. A typical soda-lime glass formulation comprises approximately 72% silica as the network former and approximately 14–15% sodium oxide, 9–11% calcium oxide, 2–3% magnesium oxide, and 1–2% alumina as modifiers and fluxes. This formulation provides good transparency while enabling the glass to act as a barrier. The engineering of the composition and methods for the manufacture of soda-lime glass are well known. It is one os society's cheapest and most abundant manufactured materials.

Because soda-lime glass is so common, glass beads for reflective and impact process purposes (for cleaning and shot-peening) are made from it. The bead making process consists of heating particles ranging in size (maximum dimension) from a few microns up to a few millimeters in a flowing gas. The particles are heated until the surface tension is broken, at which point spheroidization occurs. Soda-lime glass is well suited to this process in terms of softening, annealing, and melting temperatures.

Soda-lime glass spheres having diameters from about 1 micron up to about 4 millimeters have long been used in a variety of applications in industry and transportation. An early application of glass beads, generally those ranging in size from 1.5 to 3.5 millimeters, was in the separation of pigments in connection with the process of introducing pigment masses into solvents in which they are to be used as paints. Glass beads ranging in size from 300 microns to 1 millimeter were employed after the development of the motion picture in motion picture screens as reflective elements. Glass beads in the size range 150–700 microns are utilized in roadway reflectivity, being seeded into marking paints and other binders to provide reflectivity for drivers travelling at night. Their contribution to highway safety has been documented in well-constructed tests, and theoretical justification for their use has been developed in scientific papers. Glass beads in the size range of 11–250 microns have been established as a leading fine abrasive medium for the cleaning and finishing of metals, generally substituting for chemical cleaning or the use of angular abrasives. Glass beads in the size range of 100–450 microns have been utilized as a shot-peening medium for the surface conditioning of metals to add to their fatigue strength and fatigue life. This technology has developed in the last fifteen years as a scientific as well as an engineering discipline, and is now broadly employed in the construction of fuel-efficient aircraft and aircraft engines.

The material characteristics of the soda-lime formulations are desirable for reflective and impact glass beads. Soda-lime glass beads are typically used for removing scale and/or coatings from and for finishing aircraft engine parts or materials which must meet specifications for a smooth surface finish. Their hardness is approximately 490–510 Knoop, their Young's Modulus is $10 \times 10^6$, and their refractive index is about 1.5. With these properties, the material is sufficiently hard to shotpeen metals. That is, when blasted with the glass beads at sufficient velocities, metal surfaces with hardnesses of less than Rockwell C55-60 will move under the impact of the particles. This permits the use of glass beads as a shot-peening media and is also responsible for part of their cleaning action. When the metal is moved, the bond between the metal and scales or coatings is broken, allowing the beads to crack the scales or coatings and move them away. Glass beads also clean by friction with a stream of glass on the surface of a coating or contaminant.

The hardness of the glass is also sufficient to resist the friction of road wear in roadway reflective applications. The glass beads are embedded in center and edgeline paints or plastic binders to retroreflect the light from automobile and truck headlights. Their use on the road surface exposes them to enormous stresses from the tires of the vehicles which pass over them.

Japanese patent publication JP77003612 B4 discloses certain highly refractive glasses—which are not silica-based—for making beads. Specifically, glasses containing 1–5% $B_2O_3$ and/or $SiO_2$, 0.5–5% CaO, 10–20% BaO and/or SrO, 20–50% PbO, and 25–55% $TiO_2$, with PbO+$TiO_2$= 70–85%, were used for preparing glass beads for light-reflecting tape or road signs. Thus, a glass melt containing 3% $SiO_2$, 2% CaO, 10% BaO, 45% PbO, and 40% $TiO_2$ was quenched to obtain a cullet, dried, pulverized, and heated to obtain a fine bead having a refractive index of 2.30.

At the present time, about 500,000 metric tons of glass beads are utilized each year in industry and in highway markings around the world. On occasion, new formulations of glass have been attempted, but none have met the qualifications of improving properties or reducing costs in the manner provided by the present invention.

CRT glass

With the advent of color television, personal computer color display units, and cathode ray tube ("CRT") work stations attached to computers, an increasing amount of potentially hazardous waste has been introduced into the world. Color CRT tubes are manufactured by joining the panel, which is the front of the tube, to the funnel at the rear of the tube with a glass-ceramic lead frit. This technology was developed in the early stages of making color CRT tubes. Panel glass is a formulation based upon the normal constituents of alkaline glasses but with strontia, baria, and lead added. More specifically, panel glass is a lead glass containing from 22% to 24% lead oxide and other conventional lead glass constituents and using potash as the principal alkaline flux rather than soda.

Black-and-white CRT panels are typically composed of $SiO_2$, $Al_2O_3$, $B_2O3$, $Li_2O$, $Na_2O$, $K_2O$, $TiO_2$, and $CeO_2$. Color CRT panels are typically composed of $SiO_2$, $Al_2O_3$, $Na_2O$, $K_2O$, MgO, CaO, BaO, PbO, SrO, $TiO_2$, $CeO_2$, $As_2O_3$, and $Sb_2O_3$. Necks and funnels for color CRTs are typically composed of $SiO_2$, $Al_2O_3$, $Na_2O$, $K_2O$, MgO, CaO, PbO, and SrO.

The lead frit used to join the panels (fronts) and funnels (rear) of TV glass is soluble in mild acids such as acetic acid. It has therefore been determined that broken CRT waste constitutes a hazardous waste in landfills. Germany, Switzerland, and France are considering regulations to prohibit the landfilling of consumer-owned television sets. In the United States, consumers are still exempt from such hazardous waste laws. Broken tubes and associated debris from televisions manufacturing, known in the trade as "dirty cullet" has, however, been restricted from landfilling; it may be disposed of only after "stabilization". It is anticipated that eventually legislation will be necessary to prohibit the landfilling of CRT tubes.

U.S. Pat. No. 5,273,566 teaches a process for the manufacture of high hardness abrasive materials containing 15–35% alumina. Among the waste glasses mentioned as sources of raw material for the process are glass wastes from television and cathode ray tubes.

Japanese patent publication JP 57011846 A discloses a method of making glass of high refractive index that comprises adding a compound of titanium, barium, zinc, or lead to the glass from waste cathode ray tubes and thermally fusing it. This is used to form glass beads having refractive indices in the range 1.65–1.85. In an example, a color television tube is crushed and metallic parts are removed, then 129 parts of barium carbonate (100 parts as BaO) is added to 100 parts of the crushed glass, mixed thoroughly, and fused for four hours at 1400° C., to yield a colorless transparent glass having a refractive index of 1.65. The glass beads are taught to be useful for traffic signals, etc.

Desirable Improvements

In the use of glass beads for impact blasting for cleaning and shot-peening, a critical property required for the beads is fracture toughness. With respect to impact beads, in typical shot-peening applications, the consumption in terms of percent per cycle for beads with diameters ranging in size from 420 to 600 microns is from 3.8–13.3 %/ cycle when achieving an Almen intensity of $0.012A_2$. Glass beads are "consumed" by being shattered. As discussed elsewhere herein, such shattering can result in relatively large angular particles, which can damage the surface of the metal object being cleaned, or can create harmless powder.

An Almen test strip is a flat piece of metal that is clamped to a solid block and blasted with a peening media. This causes the strip to curve, or arc, upon removal from the block. The height of the curved metal, which is directly proportional to the intensity of the shot-peening to which it has been subjected, is reported in units of "$A_2$". The designation $0.007A_2$, for instance, means an arc height, measured with an Almen number 2 guage, of 0.007 inches using a strip of A.I.S.I. 1070 spring steel heat-treated to 44–50 Rc and 3.0"×0.75"×0.051"±0.001". In cleaning applications, the consumption of conventional glass beads ranges up to 5.5%/cycle at Almen intensities of $0.007A_2$. At an Almen intensity of $0.008A_2$, the consumption of conventional glass beads ranges up to 8.75%/cycle.

SUMMARY OF THE INVENTION

The present invention addresses the need for improvement in glass bead performance by using glasses of different formulations to provide for the specific benefits that are needed. These new formulation increase the elasticity of glass beads with notable reductions in their impact consumption and fracture characteristics.

The present invention provides silica-based glass beads that have improved fracture toughness. Improved beads formulated in accordance with the present invention are suitable for use as reflective elements in roadway markings and as cleaning agents in shot-peening metal cleaning procedures. It has been discovered that CRT waste glass provides a convenient source of raw materials for the manufacture of glass beads formulated according to the present invention. The cost of disposal of dirty cullet and the cost of disposal of glass materials received from recycled television tubes should enable users of CRT cullet to charge recycling fees, in effect obtaining the raw materials at a negative cost.

The present invention thus provides products that may make use of the special characteristics of CRT panel and funnel glass in formulations of glass frit. These formulations in some cases utilize the funnel glass waste separately from the panel waste, and in some cases use both together. The invention comprises the use of formulations that include larger molecules, such as lead oxides, barium oxides, and—preferably—strontium oxides, within the soda-lime or alkaline glass formulations.

The glass beads that comprise one aspect of the present invention constitute an improvement over conventional glass beads. The improvements include an improved impact cleaning bead; and improved shot-peening media bead; an improved media mill bead; and an improved retroreflective bead. In each of these applications, there are specific properties that are desirable and that are improved in accordance with the present invention.

In addition to the substantial reduced consumption advantage resulting from the increased fracture resistance, glass beads formulated as described herein also provide increased speed of cleaning. A further benefit of the present invention is a reduction in the amount of glass embedded in the surfaces of the metal articles being blasted or shot-peened therewith.

The present invention includes the discovery of individual formulations of CRT glass blended with other ingredients which serve to enhance specific properties for specific applications. This includes the development of formulations utilizing CRT glass which broadly serve the applications that are manufactured in the same process.

Still another aspect of the present invention is a glass frit from which superior glass beads can be made. This frit is produced and formulated in a glass melter, by a procedure which is described in detail hereinbelow.

DESCRIPTION OF THE PREFERRED EMBODIMENTS

Formulations

The present invention provides glass beads based upon silica that contain an oxide of a metal having an atomic radius of at least about 1.9 Å as a fracture resistance improvement component. The metal is preferably barium (atomic radius=1.98 Å) or strontium (atomic radius=1.91 Å), with strontium being the element that is most preferred in the context of the present invention. The metal, in the form of its oxide, is present in the glass beads in an amount effective to impart fracture resistance to the glass beads. The amount of metal oxide present in the glass beads may range from about 5 to about 25% by weight, and preferably constitutes from about 8 to about 16% by weight.

Constituents of glass beads in accordance with the present invention may include $SiO_2$, $Al_2O_3$, $Na_2O$, $K_2O$, $BaO$, $SrO$, $TiO_2$, and $CeO_2$. The glass of which the glass beads is made will generally contain by weight at least 40% $SiO_2$ as the network former, from about 10 to about 25% $Na_2O$ and $K_2O$ as fluxes, from about 5 to about 25% of BaO and/or SrO as a fracture resistance improvement components, a small amount of $Al_2O_3$, and—when made from CRT waste—small amounts of $TiO_2$ and $CeO_2$. A preferred range for the silica is 50–75%, most preferably 57–66%, for the sodium oxide is 5–15%, most preferably 7–10%, for the potassium oxide is 5–15%, most preferably 7–10%, for the barium oxide is 0–10%, for the strontium oxide is 6–16%, most preferably 8–14%, for the alumina is 0.1–10%, most preferably 0.25–4%, for the titanium oxide is 0.05 to 1%, most preferably 0.1–0.5%, for the cerium oxide is 0.05–1%, most preferably 0.1–0.5%, and for other components, i.e., trace compounds, is 0–5%.

Three examples of glass formulations in accordance with the present invention, showing weight-percentages, are presented in Table 1.

TABLE 1

| Glass Component | Formulation No. 1 (wt %) | Formulation No. 2 (wt %) | Formulation No. 3 (wt %) |
|---|---|---|---|
| $SiO_2$ | 61–64 | 59–63 | 61–64 |
| $Al_2O_3$ | 0.25–3 | 1–3 | 2–4 |
| $Na_2O$ | 7–9 | 7–9 | 8–10 |
| $K_2O$ | 7–9 | 6–9 | 7–9 |
| CaO | 0–30 | 0–3 | 1–4 |
| MgO | 0–2 | 0–1 | 1–2 |
| SrO | 8–11 | 9–11 | 11–14 |
| BaO | 1–3 | 5–9 | 0–1 |
| PbO | 1–3 | 0 | 0 |
| ZrO | 0 | 1–3 | 0 |
| $Sb_2O_3$ | 0.2–0.4 | 0.2–0.4 | 0.6–1 |
| $TiO_2$, $CeO_2$, and others | 0.2–2 | 0.2–2 | 0.2–2 |

Manufacture

Glass beads in accordance with the present invention may be manufactured by forming a batch of glass-making materials from waste CRT glass, heating the glass-making materials to melt them and to volatilize any organic contaminants associated with the waste as well as any volatilizable heavy metals therein, removing the organic materials and the volatilized heavy metals from the melted glass-making materials, and fritting the glass-making materials to form glass particles, which are generally angular at this stage. The glass melter is preferably equipped with a Waterloo scrubber associated with a dross cover that treats heated air to remove the organic and volatilizable inorganic toxins therefrom and to wash acid gasses therefrom. The fritted glass particles are then melted in order to cause the individual particles flow into spheroidal shapes, which are subsequently cooled to form the glass beads of the invention. This process is discussed in more detail below.

In one embodiment, the present invention is a process for making an effective and environmentally acceptable glass bead product from the waste materials including black-and-white and especially color television and computer monitor cathode ray tubes. The process preferably comprises the general steps of: preprocessing the waste stream; grouping the waste stream into different batches of glass-making materials; optionally, mixing the feed stream with other glass-making materials to form a batch mixture; melting the glass-making materials to form glass; fritting the glass to form angular particles; and heating the angular particles to form glass beads. The process also oxidizes any organics and vaporizes volatile heavy metal oxides contained in the glass-making batch during the melting phase. Heavy metal oxides, which may be discharged with the exhaust gases, may later be recovered.

The CRT waste stream employed in this process typically includes a relatively high strontium content, other heavy metal elements and compounds, and organic and as well as other inorganic wastes and toxins.

The pre-processing step of the present invention includes the extraction of soluble salts from the waste stream. This pre-processing step includes a hot water extraction process for removing soluble salts from the waste stream. The hot water extraction process is done as waste materials arrive for processing. The incoming waste is washed and stirred in a water bath equal to approximately twenty times the weight of the raw waste being washed. The water bath is a hot water bath in which the bath temperature is maintained at an elevated temperature, preferably about 50°–80° C. The materials will remain in the water bath for a period of time sufficient to extract a significant portion of the soluble salts, preferably for about 2 hours. Of course, it is within the skill of the art to vary these and other process parameters widely, depending upon the composition of the waste and the results desired. The resulting solution is passed through a filter press, where the insoluble components of the waste stream are caught and retained as a filter cake. The filter cake is then partially dried and repackaged. A number of different filter cakes can be merged for easier control of assaying. The material is also weighed before the extraction process and again after the hot water extraction.

A batching matrix may be used to organize the extracted material for batchings and melting. After completing the hot water process, the extracted filter cakes of the hazardous wastes are segregated and merged into lots. These lots are then sampled by known assaying methods for organic content, strontia content, and the content of other relevant materials. While any number of known assaying techniques may be employed, it is most important to accurately measure the percentage of strontia and the percentage of inorganic materials. Accordingly, the amount of organic material may be easily ascertained by conducting an energy content test, or a loss-on-ignition test. A thermogravimetric analysis may also be employed to identify the amount of organic material present in the lot, as well as the percentage of hydrates. The presence of heavy metals can be easily determined through the use of an atomic absorption spectrophotometer or other similar techniques. A combination of each of these tests, plus historical data relating to specific type of waste generated by specific waste generator can be used to establish the characteristics of the materials. The data collected from the analysis of each lot is employed for the development of melting batches incorporating the addition of optional addition glass formers and modifiers such as silica and soda ash if desired. The contents of each batch will, in turn, meet the required product specifications.

In accordance with this embodiment of the present invention, the hatched mixture is next delivered to an apparatus adapted to melt the batch mixture into a glass-like material in an oxidizing environment. The melting apparatus is further adapted to oxidize organic materials and vaporize heavy metal oxides in the gas stream. Under certain circumstances, it may be desirable to add collected heavy metal oxides to the batch mixture, for instance, if necessary to provide sufficient strontium oxide to the glass-making mixture. Of course, make-up strontium oxide or other components of a desired formulation may be obtained from any source. Melting in an oxidizing environment is required in order to assure that organic materials are oxidized as completely as possible from the batched mixture. An oxidizing environment also serves the function of oxidizing at least some fine elemental or alloyed metal particles in the batched mixture. Moreover, failure to melt the batched mixture in an oxidizing environment could lead to reduction of the heavy metals or other metal oxides, particularly if carbon is present in the batched mixture. Carbon would reduce metal oxides to the metal and carbon dioxide, thus making it more difficult to reclaim the metal component of the batched mixture. An appropriate apparatus for melting the batch mixture is a glass melter that is also adapted to oxidize organic materials in the glass-making batch. Thorough oxidation of organic materials is ensured by providing an oxygen injection system that assures an oxidation atmosphere in the melter.

As embodied herein, the glass melter also vaporizes vaporizable heavy metal oxides, such as for example, lead and cadmium oxides, in the batch mixture. The vaporized heavy metal oxides are directed from the melter to a scrubber attached to the melter via an exhaust duct. The scrubber is a wet/dry scrubber which condenses the metal oxides from the stream of vaporized materials. Vaporized heavy metals are preferably maintained in the vapor state in the melter and in the exhaust path from the melter to the first quench zone of the scrubber. Temperatures along the exhaust path should be maintained between 1000°–1400° C., and preferably above about 1100° C., to avoid the precipitation of the heavy metals prior to the quench zone. Premature precipitation will cause such the heavy metals to accumulate in the exhaust pathway.

In a preferred embodiment of the invention, the scrubber is a wet/dry scrubber, such as the Waterloo Scrubber known in the art, modified to recapture the vaporized heavy metal oxides and particles of the glass-making materials from the melter exhaust gases. In one embodiment of the present invention the exhaust gasses are quenched in the quench zone by exposure to a spray of water and by exposure to the water irrigated surfaces of the quench zone. The quench water is recovered and filtered through a filter press to remove the precipitated volatile heavy metal oxides such as lead oxide and cadmium oxide. In general, this water will be maintained in a slightly alkaline condition with the use of calcium hydroxide. Specifically, the scrubber liquid is maintained at a pH of about 9 and is regularly monitored to assure that it remains in an acceptable range.

The air stream is passed through a wet particle scrubbing zone or a "contact" zone where water vapor contacts the particles in the gas stream and removes them by a wetting process. The moisture is then removed from the air with the particles in the zone of an axial fan and in the moisture entrapment zone. The water containing the particles is treated in a treatment process to remove the particles in a filter. The filter cake of particles contains glass-making ingredients such as silica, alumina, magnesia, calcia, soda, and potash, which can be used in batching materials after being assayed and analyzed. After the collection materials are complete, they are assayed and the resulting data is entered into the batching matrix. They are reused in this or other glass-making processes.

After passing through the contact zone, through the axial fan, and through the entrapment zone the air is then heated to between 100°–200° C., preferably approximately 150° C. The air stream is then passed through a dry baghouse which substantially collects any remaining metal oxides allowing any remaining water to pass through and be collected for reuse or disposal.

The precipitated heavy metals are collected in a collection chamber. The metal oxides are then dried and collected. Oxides such as lead oxide and cadmium oxide can be later used as a raw material for other glass manufacturing processes.

The temperature of the glass melter is adjusted to heat to the proper melting temperature for a batch mixture of a given composition. For example, furnace temperatures may need to be increased depending on the amount of high melting point material, such as iron, that is present in the batch. Additionally, the melting point of the batch mixture may be changed by the addition of various materials. For example, certain sodium compounds such as $Na_2CO_3$, or $NaSiO_3$ may be added to reduce the melting point of the batch mixture. In addition, thermal analysis, i.e., the weight and energy gain or loss and gas emission as a sample material is heated to, for example, 1000° C. in 10° C. increments and viscosity measurements are also input into the process base data in order to determine the optimum melter temperature. Melting will occur in an oxygenizing atmosphere, though the time/temperature regimen will depend upon the starting materials of the batch mixture and the specific composition of the material. For example, materials with a high content of metal oxides with high melting temperatures will take longer to melt at a given temperature.

As embodied herein, the melter should provide for a long dwell time. The melter should also provide for oxygen injection to insure complete oxidation of the organic compounds. In a preferred embodiment of the present invention, the melter will oxidize up to 500 ppm toxic organics, allowed in the waste stream under current EPA regulations. The final product is discharged (as described below) directly into a water bath (i.e. "fritted").

In a preferred embodiment of the present invention the resulting glass is fritted to the correct shape. Sizing of the materials is accomplished by discharging the material at a temperature between 1000°–1400° C., preferably approximately 1200° C., from the melter to a quenching water bath. This produces blocky or block-like, round or spheroidal, and pyramidal shaped particles. The temperature at fritting is critical to produce this result. This temperature of the outflow of glass must be adjusted to impart to the glass a low viscosity just prior to fritting.

The particles are then heated until the surface tension is broken, at which point spheroidization occurs.

Utilization

The invention comprises the use of formulations that include larger molecules, such as barium oxides and—preferably—strontium oxides, within the soda-lime or alkaline glass formulations. These larger molecules significantly increase the ability of the glass to absorb energy. When this occurs, fracture toughness is increased substantially.

When glass beads are used in shot-peening operations, some of the individual beads fracture as they strike the surface being treated. Thus a bead of a given size is transformed into two or more smaller particles, some or all of which may be ineffective for use as shot-peening media. Testing of used shot-peening media compares sieve analyses of the media before and after use. The smaller particles caused by deterioration during use are identified by increases in the number of particles in a sample passing through smaller sieve openings.

Tests were carried out as follows. Samples of nominal 125–180 micron shot-peening media were sieved with U.S. standard sieves after splitting according to the Tyler ASTM procedures. These are agitated until no further material passes each sieve at which time the weight retained in the sieve is recorded. The samples were then used for four cycles of shot-peening under these conditions: 45 p.s.i., 10" distance, 90° angle, ¼" nozzle, 3/16" grit stem, 62B target. Results were as reported in Table 2.

TABLE 2

| U.S. Sieve Openings in Microns | Control Un-used | Control After 4th Cycle (%) | Lot C Un-used | Lot C After 4th Cycle (%) | Lot D Un-used | Lot D After 4th Cycle (%) |
| --- | --- | --- | --- | --- | --- | --- |
| 180 | 5.32 | 5.51 | 17.67 | 14.75 | 7.47 | 5.57 |
| 150 | 38.25 | 31.39 | 43.47 | 38.33 | 31.92 | 27.70 |
| 125 | 37.29 | 33.91 | 28.85 | 31.96 | 25.97 | 26.19 |
| 106 | 11.82 | 12.77 | 8.18 | 9.17 | 14.93 | 16.37 |
| 90 | 5.18 | 7.96 | 1.56 | 3.02 | 11.56 | 12.75 |
| 75 | 1.26 | 3.86 | — | — | 4.98 | 6.05 |
| 63 | — | 2.05 | — | — | — | 2.86 |

As can be seen from the results reported in Table 2, the average percent per cycle consumed for the control glass beads was 2.52%, while the average percent per cycle consumed for Lots C and D of the present invention were 1.24% and 1.47%, respectively, for an average of 1.3%. In other words, the rate of consumption of the glass beads formulated in accordance with the present invention was approximately half that of conventional soda-lime glass beads.

Similar tests were conducted with samples of nominal 75–127 micron glass beads. Results were as reported in Table 3.

TABLE 3

| U.S. Sieve Openings in Microns | Control Un-used | Control After 4th Cycle (%) | Lot C Un-used | Lot C After 4th Cycle (%) | Lot D Un-used | Lot D After 4th Cycle (%) |
| --- | --- | --- | --- | --- | --- | --- |
| 125 | 4.5 | 2.99 | 1.33 | 3.23 | 1.27 | 1.4 |
| 106 | 34.83 | 31.58 | 32.34 | 29.76 | 20.49 | 20.46 |
| 90 | 36.06 | 38.82 | 42.39 | 43.06 | 39.3 | 40.32 |
| 75 | 16.3 | 15.88 | 20.5 | 19.39 | 23.82 | 22.3 |
| 63 | 6.31 | 6.73 | 3.25 | 3.68 | 11.48 | 11.19 |
| 53 | — | 1.85 | — | — | 2.48 | 2.0 |
| 45 | — | .71 | — | — | .84 | 1.4 |

As can be seen from the results reported in Table 3, the average percent per cycle consumed for the control glass beads was 0.60%, while the average percent per cycle consumed for Lots C and D of the present invention were 0.28% and 0.09%, respectively, for an average of 0.19%. In other words, the rate of consumption of the glass beads formulated in accordance with the present invention was approximately one-third that of conventional soda-lime glass beads.

Similar tests were conducted with samples of nominal 75–127 micron glass beads, this time however using an impingement angle of 60° rather than 90°. Results were as reported in Table 4.

TABLE 4

| U.S. Sieve Openings in Microns | Control Unused | Control After 4th Cycle (%) | Lot C Unused | Lot C After 4th Cycle (%) |
| --- | --- | --- | --- | --- |
| 125 | 4.5 | 2.46 | 4.17 | 3.35 |
| 106 | 34.83 | 35.38 | 35.56 | 28.45 |
| 90 | 36.06 | 34.44 | 38.64 | 40.09 |
| 75 | 16.3 | 16.38 | 17.75 | 22.77 |
| 63 | 6.31 | 6.47 | 3.6 | 4.42 |
| 53 | — | 2.64 | — | .51 |
| 45 | — | — | — | .17 |

As can be seen from the results reported in Table 4, the average percent per cycle consumed for the control glass beads was 0.76%, while the average percent per cycle consumed for Lot C of the present invention was 0.36%. In other words, the rate of consumption of the glass beads formulated in accordance with the present invention was approximately half that of conventional soda-lime glass beads.

The glass beads of the present invention may be used as impact cleaning beads, shot-peening media beads, media milling beads, and retroreflective beads. With respect to impact beads, the key attributes are sphericity and fracture toughness. With respect to shot-peening media, sphericity and fracture toughness are key, along with fracture mechanism. It is desirable in fracturing that beads disintegrate into powder, rather than into half-spheres which can damage the surfaces being shot-peened. For media milling beads, the key attributes are sphericity and surface toughness. For highway reflective beads, the key attributes are refractive index and surface toughness.

As indicated, one utility of glass beads formulated in accordance with the present invention is in the cleaning of metal objects by shot-peening. Using glass beads formulated in accordance with the present invention reduces the amount of time necessary to achieve a selected degree of cleaning as compared to the amount of time that would be necessary to achieve the same degree of cleaning using conventional glass beads. Thus, cleaning times, and concomitant labor costs, can be reduced by utilizing glass beads formulated in accordance with the present invention in place of conventional glass shot-peening beads.

Although this invention has been described with reference to certain specific embodiments thereof to illustrate the principles embodied therein, those skilled in the art will readily conceive of alternate means of obtaining the benefits of the invention. The scope of the invention is to be determined, therefore, by the language and spirit of the appended claims.

What is claimed is:

1. A glass bead wherein the glass comprises at least 40 weight-% $SiO_2$ and a strontium oxide in an amount effective to impart fracture resistance to the glass bead.

2. A glass bead according to claim 1 comprising $SiO_2$, $Al_2O_3$, $Na_2O$, $K_2O$, BaO, and SrO.

3. A glass bead according to claim 2 wherein the glass further comprises $TiO_2$ and $CeO_2$, each present in an amount of 1 weight-% or less.

4. A glass bead according to claim 3 comprising about 50 to about 75 weight-% of $SiO_2$, from about 10 to about 25 weight-% total of $Na_2O$ and $K_2O$, from about 5 to about 25 weight-% total of BaO and SrO, from about 0.1 to about 10 weight-% of $Al_2O_3$, from about 0.05 to about 1 weight-% $TiO_2$, and from about 0.05 to about 1 weight-% $CeO_2$.

5. A glass bead according to claim 1 wherein the glass comprises by weight about 61–64% $SiO_2$, about 0.25–3% $Al_2O_3$, about 7–9% $Na_2O$, about 7–9% O, about 0–30% CaO, about 0–2% MgO, about 8–11% SrO, about 1–3% BaO, about 1–3% PbO, and about 0.2–1% $Sb_2O_3$.

6. A glass bead according to claim 1 wherein the glass comprises by weight about 59–63% $SiO_2$, about 1–3% $Al_2O_3$, about 7–9% $Na_2O$, about 6–9% $K_2O$, about 0–3% CaO, about 0–1% MgO, about 9–11% SrO, about 5–9% BaO, about 1–3% ZrO, and about 0.2–1% Sb2O3.

7. A glass bead according to claim 1 wherein the glass comprises by weight about 61–64% $SiO_2$, about 2–4% $Al_2O_3$, about 8–10% $Na_2O$, about 7–9% $K_2O$, about 1–4% CaO, about 1–2% MgO, about 8–14% SrO, about 0–1% Ba, and about 0.2–1% $Sb_2O_3$.

8. A glass bead according to claim 1 wherein the glass further comprises from about 5 to about 25 weight-% SrO and from 0 to about 10 weight-% BaO.

9. A glass bead according to claim 1 wherein the glass further comprises from about 5 to about 25 weight-% SrO and from about 5 to 25 weight-% BaO.

10. A glass bead according to claim 1 wherein the glass further comprises from about 5 to about 25 weight-% $Na_2O$ and about 5 to about 25 weight% $K_2O$.

11. A glass bead according to claim 1 wherein the glass further comprises from about 0.1 to about 10 weight-% $Al_2O_3$.

12. The glass bead of claim 1 wherein the glass further comprises CRT panel waste glass.

13. The glass bead of claim 8 wherein the glass further comprises CRT panel waste glass.

14. The glass bead of claim 9 wherein the glass further comprises CRT panel waste glass.

15. The glass bead of claim 10 wherein the glass further comprises CRT panel waste glass.

16. The glass bead of claim 11 wherein the glass further comprises CRT panel waste glass.

17. A glass bead having improved fracture resistance comprising at least 50 weight-% $SiO_2$ as a network former, from about 10 to about 25 weight-% total $Na_2O$ and $K_2O$ as a flux, and from about 5 to about 25 weight-% of an oxide of a metal having an atomic radius of at least about 1.97k as a fracture resistance improvement component.

18. The glass bead of claim 17 wherein said fracture resistance improvement component comprises strontium oxide.

19. The glass bead of claim 18 wherein said glass bead further comprises $TiO_2$ and $CeO_2$, each present in an amount of 1 weight-% or less.

* * * * *